(12) United States Patent
De Filippis

(10) Patent No.: US 9,543,795 B2
(45) Date of Patent: Jan. 10, 2017

(54) ROTOR FOR AN ELECTRICAL MACHINE AND RELATIVE ASSEMBLY METHOD

(71) Applicant: SPAL AUTOMOTIVE S.r.l., Correggio (Reggio Emilia) (IT)

(72) Inventor: Pietro De Filippis, Varazze (IT)

(73) Assignee: SPAL AUTOMATIVE S.r.l., Correggio (Reggio) (IT)

( * ) Notice: Subject to any disclaimer, the term of this patent is extended or adjusted under 35 U.S.C. 154(b) by 352 days.

(21) Appl. No.: 14/350,450

(22) PCT Filed: Oct. 17, 2012

(86) PCT No.: PCT/IB2012/055661
§ 371 (c)(1),
(2) Date: Apr. 8, 2014

(87) PCT Pub. No.: WO2013/057673
PCT Pub. Date: Apr. 25, 2013

(65) Prior Publication Data
US 2014/0252892 A1   Sep. 11, 2014

(30) Foreign Application Priority Data
Oct. 17, 2011 (IT) .............................. BO2011A0587

(51) Int. Cl.
*H02K 1/27* (2006.01)
*H02K 15/03* (2006.01)

(52) U.S. Cl.
CPC .............. *H02K 1/27* (2013.01); *H02K 1/2773* (2013.01); *H02K 15/03* (2013.01); *Y10T 29/49012* (2015.01)

(58) Field of Classification Search
CPC ........ H02K 15/03; H02K 1/27; H02K 1/2773; Y10T 29/49012
(Continued)

(56) References Cited

U.S. PATENT DOCUMENTS 2,971,107 A * 2/1961 Korda ....................... H02K 1/17
   310/239
3,091,713 A * 5/1963 Latta ........................ H02K 1/17
   310/154.14

(Continued)

FOREIGN PATENT DOCUMENTS

CN     1287705 C     3/2001
DE     2110308       9/1971
(Continued)

OTHER PUBLICATIONS

International Search Report and Written Opinion dated Sep. 25, 2014 from counterpart app No. PCT/IB2012/055661.
(Continued)

*Primary Examiner* — Alex W Mok
(74) *Attorney, Agent, or Firm* — Shuttleworth & Ingersoll, PLC; Timothy J. Klima

(57) ABSTRACT

A rotor for an electrical machine includes a laminated core having a main axis and a plurality of poles delimiting a plurality of radial seats extending along the main axis, each seat being delimited by a first and a second pole. The rotor includes a plurality of magnets inserted in the seats and a plurality of springs locking the magnets in the seats; the springs acting between each magnet and the first pole delimiting the relative seat for pushing each magnet towards the second pole delimiting the same seat.

15 Claims, 4 Drawing Sheets

(58) Field of Classification Search
USPC .................. 310/51, 156.16, 156.19; 29/598
See application file for complete search history.

(56) References Cited

U.S. PATENT DOCUMENTS

| | | | | |
|---|---|---|---|---|
| 3,631,277 A * | 12/1971 | Ferdig | ................. | H02K 1/17 310/154.14 |
| 4,012,651 A * | 3/1977 | Burson | ................. | H02K 15/03 310/153 |
| 4,542,314 A * | 9/1985 | Corbach | ................. | H02K 1/17 310/154.18 |
| 4,580,072 A * | 4/1986 | Morishita | ............ | H02K 23/04 310/154.15 |
| 4,707,630 A * | 11/1987 | Tomite | ................. | H02K 23/04 310/154.12 |
| 4,745,319 A * | 5/1988 | Tomite | ................. | H02K 1/17 310/154.15 |
| 4,918,830 A * | 4/1990 | Aso | ................. | H02K 1/17 29/596 |
| 4,933,582 A * | 6/1990 | Hata | ................. | H02K 5/145 310/154.14 |
| 5,763,974 A * | 6/1998 | Vacca | ................. | H02K 1/17 310/152 |
| 6,836,954 B1 | 1/2005 | Carli et al. | | |
| 7,679,250 B2 * | 3/2010 | De Godoy | ............ | H02K 23/04 310/154.14 |
| 7,911,104 B2 * | 3/2011 | Ifrim | ................. | H02K 1/2773 310/156.19 |
| 8,058,760 B2 * | 11/2011 | Hirabayashi | ......... | H02K 1/185 310/154.03 |
| 8,264,119 B2 | 9/2012 | Badey | | |

FOREIGN PATENT DOCUMENTS

| | | | | |
|---|---|---|---|---|
| DE | 102008044187 | | 6/2010 | |
| DE | WO 2012022731 A2 * | 2/2012 | ............ | H02K 1/17 |
| EP | 1223658 | | 7/2002 | |
| EP | 1223658 A1 | | 7/2002 | |
| FR | 2895165 | | 6/2007 | |
| JP | 2008-301679 | | 12/2008 | |
| WO | 2011/116776 | | 9/2011 | |

OTHER PUBLICATIONS

Chinese Office Action dated Jun. 14, 2016 from counterpart Chinese App No. 201280050884.0.

* cited by examiner

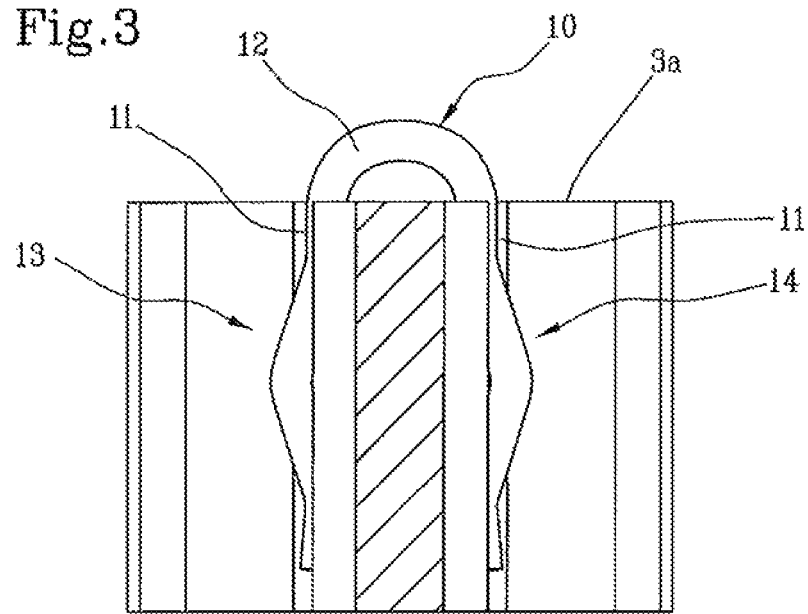
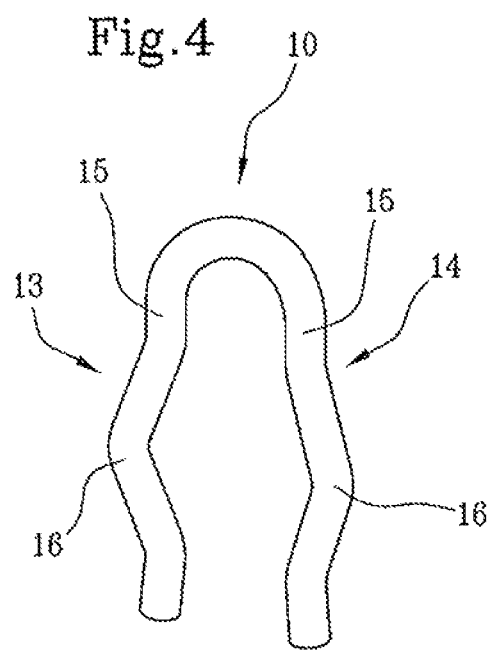
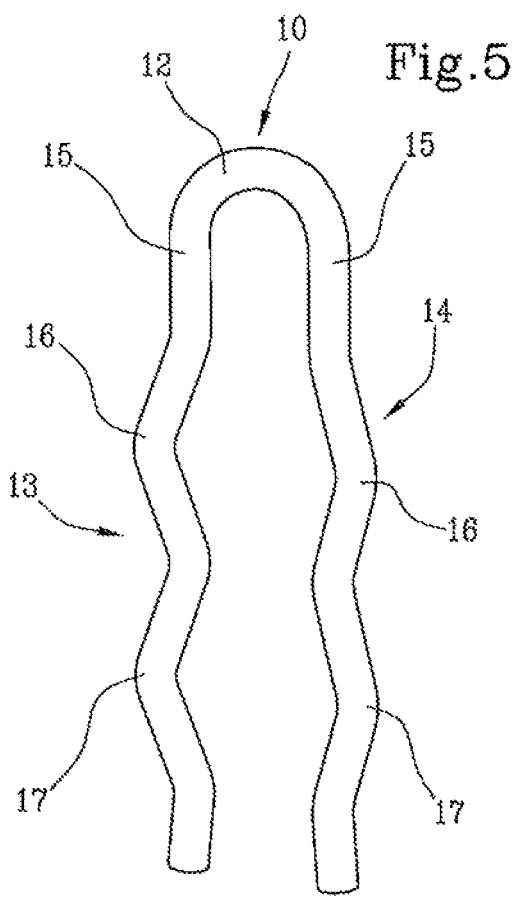

ROTOR FOR AN ELECTRICAL MACHINE AND RELATIVE ASSEMBLY METHOD

This application is the National Phase of International Application PCT/IB2012/055661 filed Oct. 17, 2012 which designated the U.S. and that International Application was published under PCT Article 21(2) in English.

This application claims priority to Italian Patent Application No. BO2011A000587 filed Oct. 17, 2011, which application is incorporated by reference herein.

TECHNICAL FIELD

This invention relates to a rotor for an electrical machine, in particular a rotor with permanent magnets, and the system of locking the magnets in the relative seats; this invention also relates to the method for assembling the rotor.

BACKGROUND ART

The rotors of motors with permanent magnets of known type, used especially in brushless motors, usually consist of a laminated core, that is to say, a core made up of a pack of thin metal laminations and having a principal axis that coincides with the axis of rotation of the motor.

The rotor normally has a plurality of longitudinal slots and a central hole, which extend parallel to the main axis, for accommodating the magnets and a drive shaft, respectively.

The slots form in the laminated core a sort of segment structure, forming the poles of the rotor, where each segment, which remains connected to a central portion of the laminated core surrounding the hole of the shaft, separates two adjacent slots.

The magnets extend along the axis of the rotor, in which they are positioned radially, arranged, in general, against a par of respective contact elements at the outer end of the relative slot which is generally open on the outer surface of the rotor (except for the aforesaid contact elements).

A common problem with this type of rotor linked to the method of fixing the magnets in the relative slots.

The magnets must be attached in the slots in a precise position both for the correct electromagnetic operation of the motor and so as not to trigger vibrations during operation of the motor.

In the reference rotors for this invention, that is, with the magnets positioned radially, one prior art solution glues the magnets in the relative seats. The magnets with glue on them are inserted in the relative slot and held by a special tool abutted against the outer contact elements until the glue sets.

In a different embodiment, the magnets are held in position in the slot by a tool whilst the rotor is inserted in a mould where plastic is injected. In this way, the magnets are co-pressed with the laminations and held in position by the plastic.

The aforesaid prior art solutions are relatively expensive due to the assembly complexity.

In another embodiment, which is the one most commonly used, each magnet is held abutted against the contact elements by a radially pushing spring interposed between the magnet and the central portion of the laminated core.

These springs may be single (one for each magnet) or grouped together in a singular annular element.

In this solution a major disadvantage is that given a magnet, the corresponding spring, due to the mechanical tolerances for inserting the magnet, may push the magnet in a not perfectly radial direction so that it abuts against only one of the contact elements prepared, that is, against only one of the segments which delimit the slot.

In some cases, there may be segments which are not stabilised by the magnets and which therefore vibrate during operation of the motor.

Moreover, the magnet may chip at the contact element due to the reduced contact surface of the latter.

DISCLOSURE OF THE INVENTION

In this context, the main technical purpose of this invention is to provide a rotor for an electrical machine which is free of the above-mentioned drawbacks.

A further aim of this invention is to provide a rotor which is relatively economical and easy to assemble.

Another aim of this invention is to provide a rotor which is not at risk, in use, of mechanical vibrations.

The above mentioned purpose and aims are substantially achieved by a rotor for an electrical machine having characteristics described herein.

BRIEF DESCRIPTION OF THE DRAWINGS

Further features and advantages of the present invention are more apparent in the detailed description below, with reference to a preferred, non-limiting, embodiment of a rotor for an electrical machine, as illustrated in the accompanying drawings, in which:

FIG. 3 is the cross-section III-III of the detail of FIG. 2;

FIG. 4 is a schematic perspective view of the rotor shown in the drawings listed above;

FIG. 5 is a schematic perspective view a detail of a second embodiment of a rotor according to this invention;

DESCRIPTION OF THE PREFERRED EMBODIMENTS OF THE INVENTION

Figure 1:
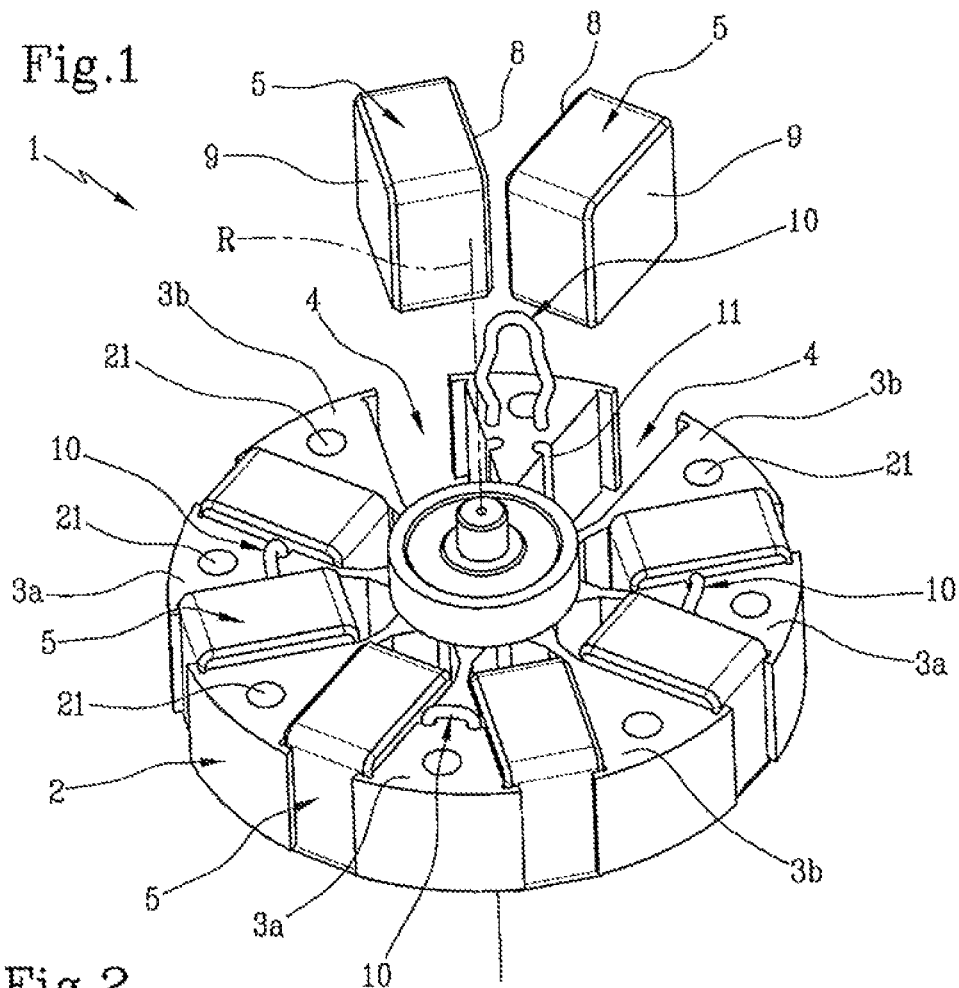
FIG. 1 is a partly exploded, schematic perspective view of a first embodiment of an eight-pole rotor according to this invention.
Figure 6:
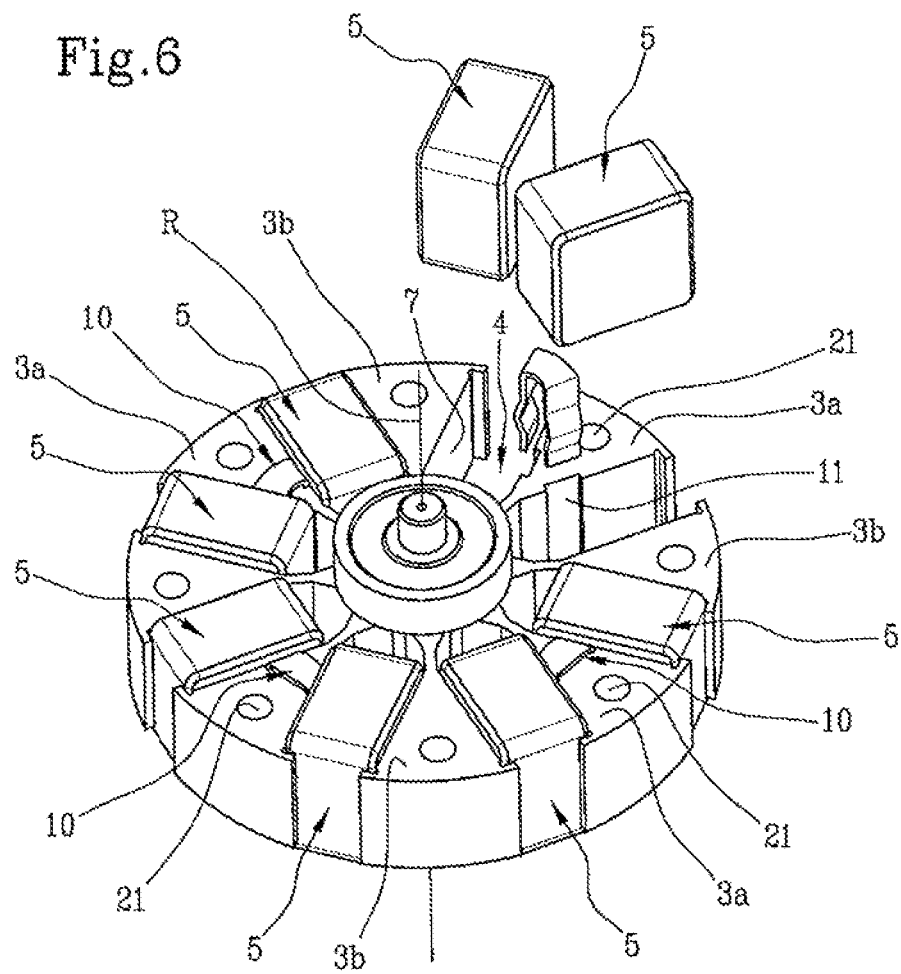
FIG. 6 is a partly exploded, schematic perspective view of a third embodiment of an eight-pole rotor according to this invention.
Figure 8:
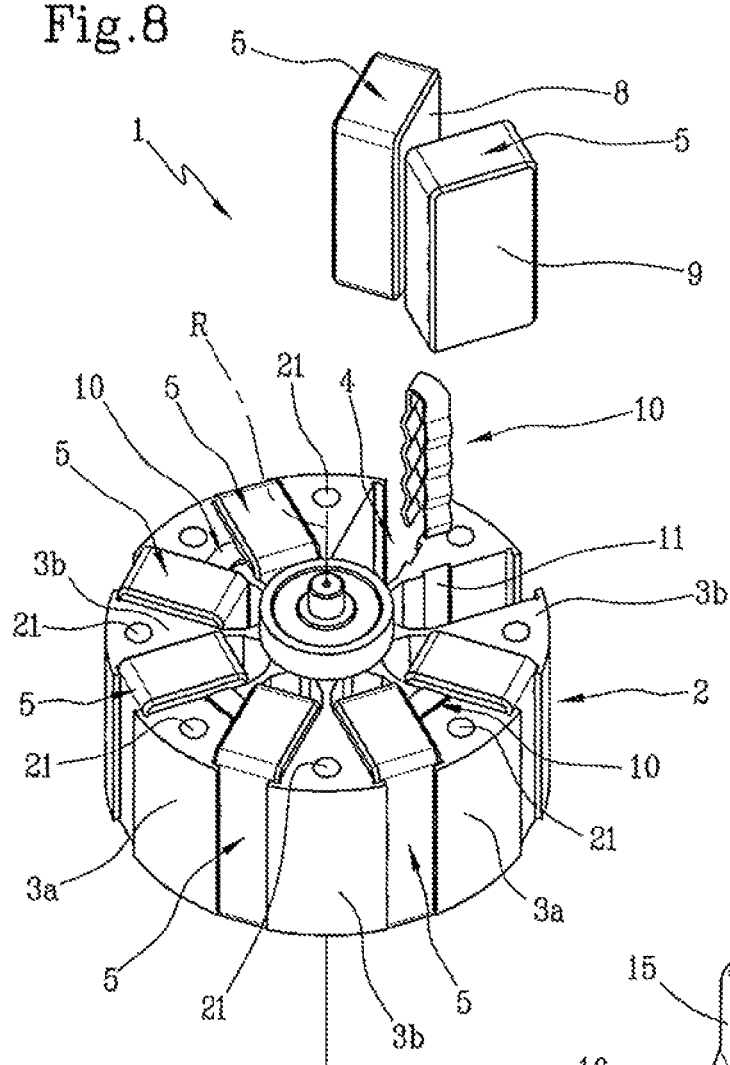
FIG. 8 is a partly exploded, schematic perspective view of a third embodiment of an eight-pole rotor according to this invention.
Figure 9:
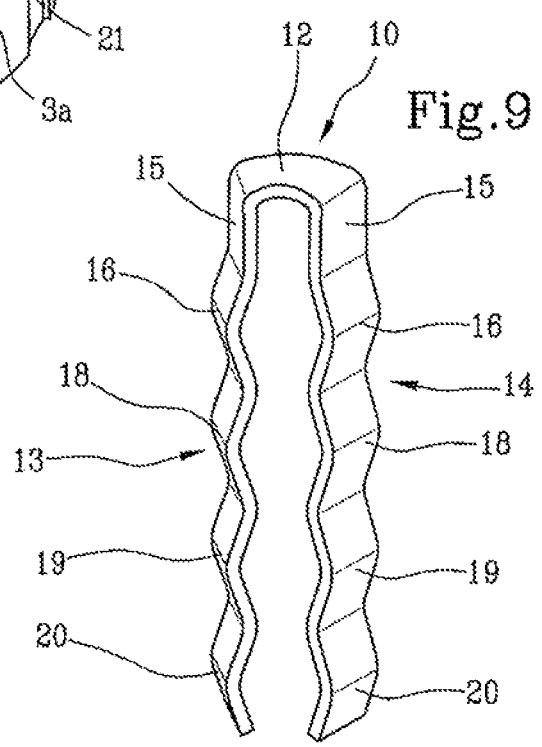
FIG. 9 is a schematic perspective view of a detail of the rotor of FIG. 8.

With reference to the accompanying drawings, in particular to FIGS. 1, 6 and 8, the numeral 1 denotes a rotor for an electrical machine according to this invention.

The rotor 1 comprises a laminated core or pack 2 of laminations having a main axis R and a plurality of poles 3a, 3b delimiting a plurality of seats 4.

The poles or teeth 3a, 3b are in the form of segments which extend radially from a central nucleus of the laminated core 2.

The seats 4 are also radial and extend (in length) according to the main axis R and are each delimited by a first pole 3a and by a second pole 3b.

The rotor 1 comprises magnets 5, eight in the example illustrated, each inserted in a corresponding seat 4.

The rotor 1 comprises elastic means of locking the magnets 5 in the seats 4 acting between each magnet 5 and the first pole 3a delimiting the relative seat 4 for pushing each magnet 5 towards the second pole 3b delimiting the same seat 4.

As illustrated, each first pole 3a has two faces 6, advantageously flat, delimiting adjacent seats 4 and each second pole 3b has two faces 7, advantageously flat, delimiting adjacent seats 4.

In other words, each seat 4 is delimited by a flat face 6 of a first pole 3a and by a flat face 7 of a second pole 3b.

Given a seat 4, the faces 6 and 7 which delimit the seat are opposite and parallel to each other so that the elastic means push the corresponding magnet 5 from the first pole 3a against the flat face 7 of the second pole 3b.

The magnets 5 are parallelepiped in shape and have a pair of flat, parallel faces 8 and 9. Preferably, the magnets 5 also have the outer surfaces ground smooth.

Numeral 8 in the accompanying drawings indicates the face of the magnets 5 facing pole 3a and numeral 9 indicates the face of the magnets 5 facing pole 3b, in particular, the relative faces 6 and 7.

The elastic means are shaped so as to push the flat face 9 of the magnet 5 against the flat face 7 of the corresponding second pole 3b delimiting the relative seat 4.

In the preferred embodiments illustrated, the aforementioned elastic means comprise a plurality of springs 10.

In general, the springs 10 are fork-shaped and they are inserted on every other tooth, that is, they are inserted on the poles 3a in the accompanying drawings provided merely by way of example.

Each spring 10 pushes on two adjacent magnets 5 forcing them against the faces 7 of the teeth 3b located on the opposite side to the spring 10 relative to the magnet 5, as described in more detail below.

In this way, each ferromagnetic tooth or pole 3a, 3b is held still by the magnets 5 which surround it.

Looking in more detail at the positioning of the springs 10, it should be noted that each pole 3a has engagement means for the relative elastic means, that is, for the springs 10.

More specifically, the engagement means for the springs 10 are in the form of grooves 11 on the faces 6 of the poles 3a.

The grooves 11 extend in parallel to the main axis R and, given a pole 3a are aligned according to a cylindrical surface having an axis corresponding with the main axis.

The springs 10 are shaped so as to squash into the relative groove 11 after inserting the magnets 5 so as to completely fill the groove 11, optimising the magnetic circuit since the springs 10 are preferably made of ferromagnetic material.

In general, therefore, the elastic means comprise a plurality of springs 10, each of which is associated with a pole 3a for pushing the corresponding magnets 5 towards the poles 3b delimiting the relative seats 4.

With particular reference to FIGS. 3, 4, 5, 7 and 9, the springs 10 for rotors 1 according to this invention are illustrated in more detail.

The springs 10 have a base stretch 12 from which two substantially parallel prongs 13, 14 extend designed to engage inside the grooves 11.

The base stretch 12 is preferably curvilinear for clasping the poles 3a and collaborating in holding in position the prongs 13 and 14.

Moreover, the base stretch 12 extends according to a circumference concentric with the rotor 1.

The grooves 13, 14 extend in parallel to the main axis R and are aligned according to a cylindrical surface having an axis corresponding with the main axis R.

The prongs 13, 14 have a first rectilinear stretch 15 and at least a second, elastically yielding, undulating stretch 16.

The undulating stretches 16 have opposite convexities relative to the pole 3a each facing towards a corresponding seat 4 and projected inside the seat 4.

The undulating stretch 16 of the prongs 13 and 14 acts on the magnets 5 inserted in two seats 4 adjacent to each other.

The rectilinear stretch 15 of the prongs 13, 14 allows, after the spring 10 has been positioned in the rotor, on the relative pole 3a, no part of the spring 10 in the seats 4 for the first millimeters so as to be able to position the magnets 5 which are then pressed inside the seats 4.

The magnets 5 and the relative seats 4 have very small assembly tolerances, in the order of a tenth of a millimeter, so it is important, for a correct positioning of the magnets 5 at the mouth of the seats 4, that there are no parts of the springs 10.

After inserting the magnets 5 in the seats 4, the springs 10 will be fully extended in the relative groove 11 (except for a decimal portion of the convex part 16 which protrudes for pushing the magnet), allowing the completion of the magnetic circuit.

In a first embodiment, illustrated in FIGS. 1 to 4, intended preferably for motors with an output of approximately 100-300 Watts and rotors with the laminated pack having a length of up to 20 mm and a diameter of up to 100 mm, a spring 10 made of spring wire and having a single undulating stretch 16 for each prong 13, 14 is sufficient.

As illustrated in FIG. 5, in a second embodiment, intended preferably for longer motors, up to approximately 100 mm, and therefore with heavier magnets 5 for the same diameter of the rotor 1, the prongs 13, 14 of the spring 10 each have a second undulating stretch 17 extending from the first undulating stretch 16.

The second undulating stretches 17 have opposite convexities each facing towards a corresponding seat 4 for the magnet 5 and projected inside the seat 4 for applying a pushing action on the corresponding magnet 5.

A steel spring wire is preferably used for the aforesaid embodiments.

So that the prongs 13, 14 of the spring 10, in particular the rectilinear stretches 15, do not obstruct the seat 4, the diameter of the wire is less than the depth of the relative groove 11.

Figure 7:
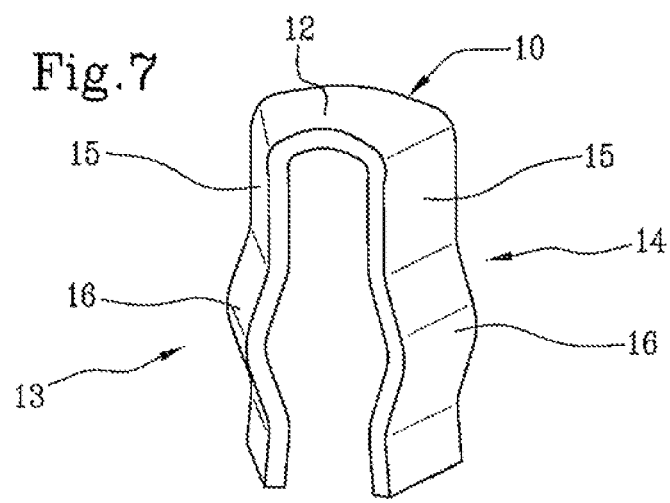
FIG. 7 is a schematic perspective view of a detail of the rotor of FIG. 6.

In a third embodiment, illustrated in FIGS. 6 and 7, preferably adopted for rotors with the length of the laminated pack up to 20 mm and the diameter greater or much greater than 100 mm, for which the magnets 5 have, concordantly, radial extension greater than the previous solutions, the springs 10 are made with metal strip suitably shaped in such a way as to apply an adequate pushing action on the magnets 5.

The shape of the spring 10 made with the metal strip corresponds with the shape of the spring 10 made with wire, that is, the spring 10 has a head or base portion 12 and two prongs 13, 14 which protrude in parallel from the base 12.

The spring 10 extends substantially for the full length of the rotor and has a length of the same order of magnitude as the corresponding tooth 3a.

The width of the metal strip is selected on the basis of the force to be applied to the magnet 5 and the weight of the magnet.

In the same way as the aforementioned embodiments, the prongs 13, 14 have a first rectilinear stretch 15 and at least a second, elastically yielding, undulating stretch 16.

The undulating stretches 16 have opposite convexities each facing towards a corresponding seat 4 and projected inside the seat 4.

The undulating stretch 16 of the prongs 13 and 14 acts on the magnets 5 inserted in two seats 4 adjacent to each other.

The rectilinear stretch 15 of the prongs 13, 14 allows, after the spring 10 has been positioned in the rotor, on the relative pole 3a, no part of the spring 10 in the seats 4 for the first millimeters so as to be able to position the magnets 5 which are then pressed inside the seats 4.

Alternatively, in an embodiment not illustrated, the metal strip spring is replaced by two or more springs 10, of the type described previously, suitably dimensioned, made from wire and spaced radially along the pole 3a.

As illustrated in FIG. 8, in a fourth embodiment, in the case of longer motors, up to and longer than 100 mm, and with a larger diameter, up to and greater than 100 mm, therefore with heavier magnets, the prongs 13, 14 of the spring 10 have a plurality of undulating stretches 18, 19, 20 extending from the first undulating stretch 16.

The additional undulating stretches 18, 19, 20 have opposite convexities each facing towards a corresponding seat 4 for the magnet 5 and projected inside the seat 4 for applying a pushing action on the corresponding magnet 5.

It should be noted that, even the springs 10 made from metal strip have initial rectilinear stretches 15 which allow the correct positioning (at the mouth of the corresponding seat 4) of the magnets 5 before inserting them in the corresponding seats.

The undulating stretches 16, 17, 18, 19, 20 of the different springs 10 are suitably made for exerting on the corresponding magnets 5 a pushing force perpendicular to the surface of the magnet 5 abutting against the spring 10.

This pushing force corresponds to a tangential force between the opposite face 9 of the magnet 5 and the face 7 of the pole against which the spring 10 is supported and pressed.

Advantageously, the springs 10 are made, as indicated, from ferromagnetic material and they are therefore less expensive than springs made of non-magnetic material used in the prior art solutions so as not to short-circuit adjacent magnets and lose magnetic flow.

The use of magnetic material for the springs 10 allows substantially to eliminate the dispersion of the flow which there would be in the air of the seat of the spring 10.

The springs 10 push, in practice, tangentially to the circumference passing through the grooves 11, each magnet 5 to move it next to the corresponding pole 3. The force pushing the magnet 5 acts perpendicularly to the magnet 5 in such a way that the friction force holding the magnet 5 in the seat 4 is generated on the entire face 9 of the magnet resting on the iron of the pack 2 of laminations.

In order to uniformly distribute the force of the springs 10 on the corresponding magnets, the springs 10 are positioned substantially on a middle section (considering the radial extension) of the corresponding magnet 5.

According to this invention, the springs 10 yield, deforming plastically, after the magnets 5 have been positioned, maintaining the elastic characteristic sufficient to push the magnet 5 against the face 7 of the pole 3b and suitable to support the thermal expansion of the motor in use.

Advantageously, the loss of part of the elastic characteristics allows the correct sizing of the spring 10 with pre-load values which are permissible and suitable for the push of the magnet 5.

With particular reference to FIGS. 1, 2, 6 and 8, it should be noted that the laminated core 2 has a plurality of holes 21 in the poles 3a, 3b which extend according to axis R.

The purpose of the holes 21 is weight reduction and they define means of engagement in the rotor for the tools which, during assembly of the motor, move the rotor 1.

A preferred method for assembling the rotor 1, given the pack 2 of laminations, comprises the steps of positioning all the springs 10 astride the relative pole 3a and simultaneously inserting all the magnets 5.

Alternatively, if one magnet 5 at a time is to be inserted, the poles 3a, 3b are maintained in reciprocal position using a tool, not illustrated, equipped with a plurality of pins which engage the aforementioned holes 21.

Figure 2:
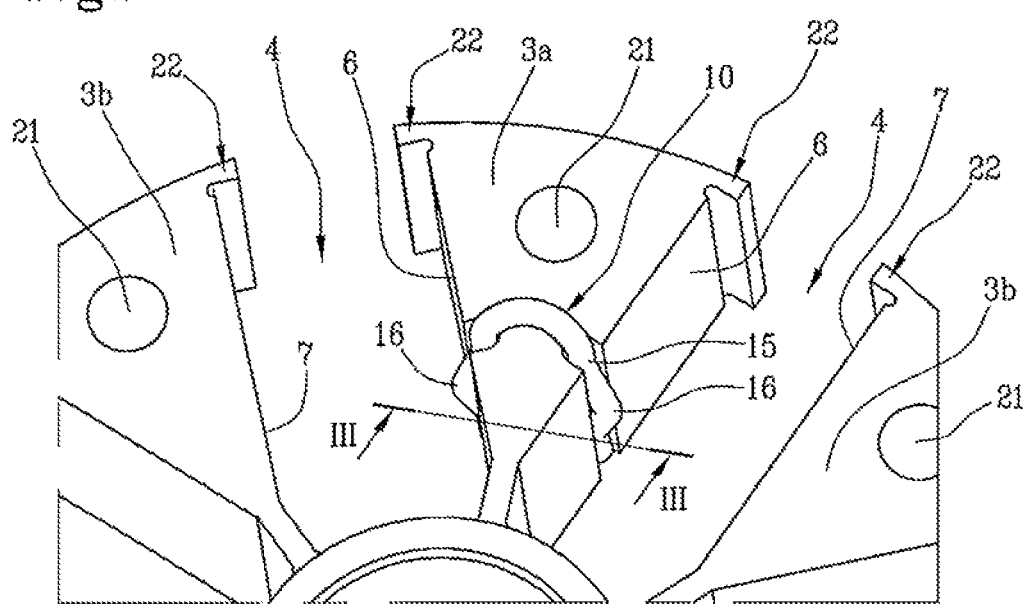
FIG. 2 is a schematic perspective view of an enlarged detail of the rotor of FIG. 1.

With reference in particular to FIG. 2, it should be noted that the laminated core 2 has teeth 22 acting on the magnets 5 at the outer peripheral ends of the poles 3. These teeth 22 extend longitudinally according to the axis R and define a radial reference for positioning the magnets 5 advantageously, the magnets 5 are held in the relative seats 4, as mentioned above, by the friction between the faces 9 of the magnets 5 and the faces 7 of the poles 3b and not by the aforementioned teeth 22.

The invention claimed is:

1. A rotor for an electrical machine, comprising:
   a laminated core having a main axis and a plurality of poles delimiting a plurality of radial seats extending along the main axis, each seat being delimited by a first pole of the plurality of poles and a second pole of the plurality of poles, wherein the first pole and the second pole alternate around the laminated core;
   a plurality of magnets inserted in the seats; and
   a plurality of springs locking the magnets in the seats, each spring of the plurality of springs being provided on the first pole of the plurality of poles,
   wherein for each first pole, the spring operates between one of the magnets and the first pole delimiting an adjacent seat for pushing the magnet towards the second pole delimiting the adjacent seat;
   each spring being positioned astride a relative first pole and pushing on two adjacent magnets to force the two adjacent magnets against faces of respective second poles delimiting the seats in which the two adjacent magnets are positioned, with the faces of the respective second poles being located on opposite sides of the two adjacent magnets relative to the spring.

2. The rotor for an electrical machine according to claim 1, wherein the first pole has two first faces delimiting the adjacent seats with the first faces and the faces of the respective second poles being parallel to each other.

3. The rotor for an electrical machine according to claim 1, wherein the plurality of springs having a base stretch from which two parallel prongs extend, the prongs having a first rectilinear stretch and at least one elastically yielding undulating stretch, each spring being fitted on a corresponding first pole, the undulating stretch of the prongs operating on the magnets of two of the seats adjacent to each other.

4. The rotor according to claim 3, wherein the prongs extend parallel to the main axis and are aligned according to a cylindrical surface having an axis corresponding with the main axis.

5. The rotor according to claim 3, wherein each first pole has grooves for engaging the relative spring.

6. The rotor according to claim 5, wherein the grooves are positioned on faces of the first pole, the prongs being inserted in the grooves, the undulating stretch having a convexity facing towards the adjacent seat.

7. The rotor according to claim 6, wherein the grooves extend parallel to the main axis and lie on a cylindrical surface having an axis corresponding with the main axis.

8. The rotor according to claim 1, wherein the magnets are parallelepiped in shape and have a pair of parallel faces facing corresponding parallel faces of the relative seat.

9. The rotor according to claim 1, wherein the plurality of springs are made from ferromagnetic material.

10. The rotor according to claim 1, wherein the plurality of springs are made from metal strip.

11. The rotor according to claim 1, wherein the plurality of springs are made from spring wire.

12. A method for assembling a rotor for an electrical machine, comprising:
providing a laminated core having a main axis and a plurality of poles delimiting a plurality of radial seats extending along the main axis, each seat being delimited by a first pole of the plurality of poles and a second pole of the plurality of poles, wherein the first pole and the second pole alternate around the laminated core;
providing a plurality of magnets for inserting in the seats;
providing a plurality of springs for locking the magnets in the seats, each spring of the plurality of springs being provided on the first pole of the plurality of poles,
providing that for each first pole, the spring operates between one of the magnets and the first pole delimiting an adjacent seat for pushing each magnet towards the second pole delimiting the adjacent seat;
positioning each spring astride a relative first pole,
positioning each magnet at the relative seat,
inserting the magnets in the relative seats;
providing that each spring pushes on two adjacent magnets to force the two adjacent magnets against faces of respective second poles delimiting the seats in which the two adjacent magnets are positioned, with the faces of the respective second poles being located on opposite sides of the two adjacent magnets relative to the spring.

13. The method according to claim 12, wherein the inserting occurs simultaneously for all the magnets.

14. The method according to claim 12, and further comprising providing relative locking of the first and second poles using holes in the poles, the inserting occurring one magnet at a time.

15. A rotor for an electrical machine, comprising:
a laminated core having a main axis and a plurality of poles delimiting a plurality of radial seats extending along the main axis, each seat being delimited by a first pole of the plurality of poles and a second pole of the plurality of poles, wherein the first pole and the second pole alternate around the laminated core;
a plurality of magnets inserted in the seats; and
a plurality of springs for locking the magnets in the seats, each spring of the plurality of springs being provided on the first pole of the plurality of poles, each spring including a base stretch from which two prongs extend, the prongs having at least one elastically yielding undulating stretch,
wherein, for each first pole, the spring operates between one of the magnets and the first pole delimiting an adjacent seat for pushing the one of the magnets towards the second pole delimiting the adjacent seat;
wherein each first pole includes grooves on faces of the first pole for engaging a relative one of the springs, with prongs of the relative one of the springs being inserted in the grooves, the undulating stretch having a convexity facing towards the adjacent seat for forcing the magnets against faces of respective second poles delimiting the seats in which the magnets are positioned.

* * * * *